INVENTORS
ALLAN E. HEINRICH
RICHARD C. HARE
WESLEY R. MASTER

BY John J. Byrne
ATTORNEY

INVENTORS
ALLAN E. HEINRICH
RICHARD C. HARE
WESLEY R. MASTER
BY John J. Byrne
ATTORNEY United States Patent Office 3,232,056
Patented Feb. 1, 1966

3,232,056
STEP VARIABLE FLUID TRANSLATOR SYSTEM
Allan E. Heinrich, Oconomowoc, and Richard C. Hare and Wesley R. Master, Wauwatosa, Wis., assignors to Applied Power Industries, Inc., Milwaukee, Wis., a corporation of Wisconsin
Filed Feb. 7, 1964, Ser. No. 343,311
7 Claims. (Cl. 60—53)

This invention relates generally to hydraulic transmission systems and mechanisms, and is particularly directed to a fluid energy translating device which gives a step variable capability to a hydrostatic transmission.

The mechanism of which this invention is a part includes a rotatable cylinder barrel containing a plurality of circumferentially spaced longitudinal and parallel cylinder bores, a piston slidably received in each bore and having a spherical surface formed on one of its ends, a stationary swash plate or cam plate associated with the pistons at their spherical ends and a valve member for sequentially transmitting fluid to and from the cylinder bores as the barrel rotates.

More specifically, the present invention provides a fluid energy translating device of the axial piston variety with simplified means for obtaining a variation in displacement by valving the piston on a partial stroke basis.

Another important objective of this invention is to provide an inexpensive, compact, light, convenient, simple and rugged step variable motor of the axial multi-piston type by providing a valving plate having apertures therein for selectively utilizing portions of a pumping stroke and return the remainder to tank of the fluid displaced by a full pumping stroke of each of the pistons.

A still further important objective of this invention is to provide a step variable apparatus which is peculiarly adaptable for use in combination with a hydraulic pump having a divided output.

A still another important objective of the invention is to provide a hydraulic transmission wherein a hydraulic step variable pump is used in combination with a hydraulic step variable motor, with appropriate circuit controls for combining each level of pump displacement with each level of motor displacement to thereby provide a transmission having a substantial number of displacement levels more than the pump or motor individually.

A still further objective of the invention is to provide a fluid energy device with a capability of delivering two or more separate flows of fluid to unrelated circuit functions.

Another important objective of the invention is the provision of a fluid energy device having a plurality of intakes and outputs, and means for feeding back at least one of said outputs to one of said intakes for varying the effective displacement of the device.

These and other important objectives and advantages of the invention will be more fully understood upon a reading of the following specifications taken in view of the attached drawings, wherein.

Figure 1:
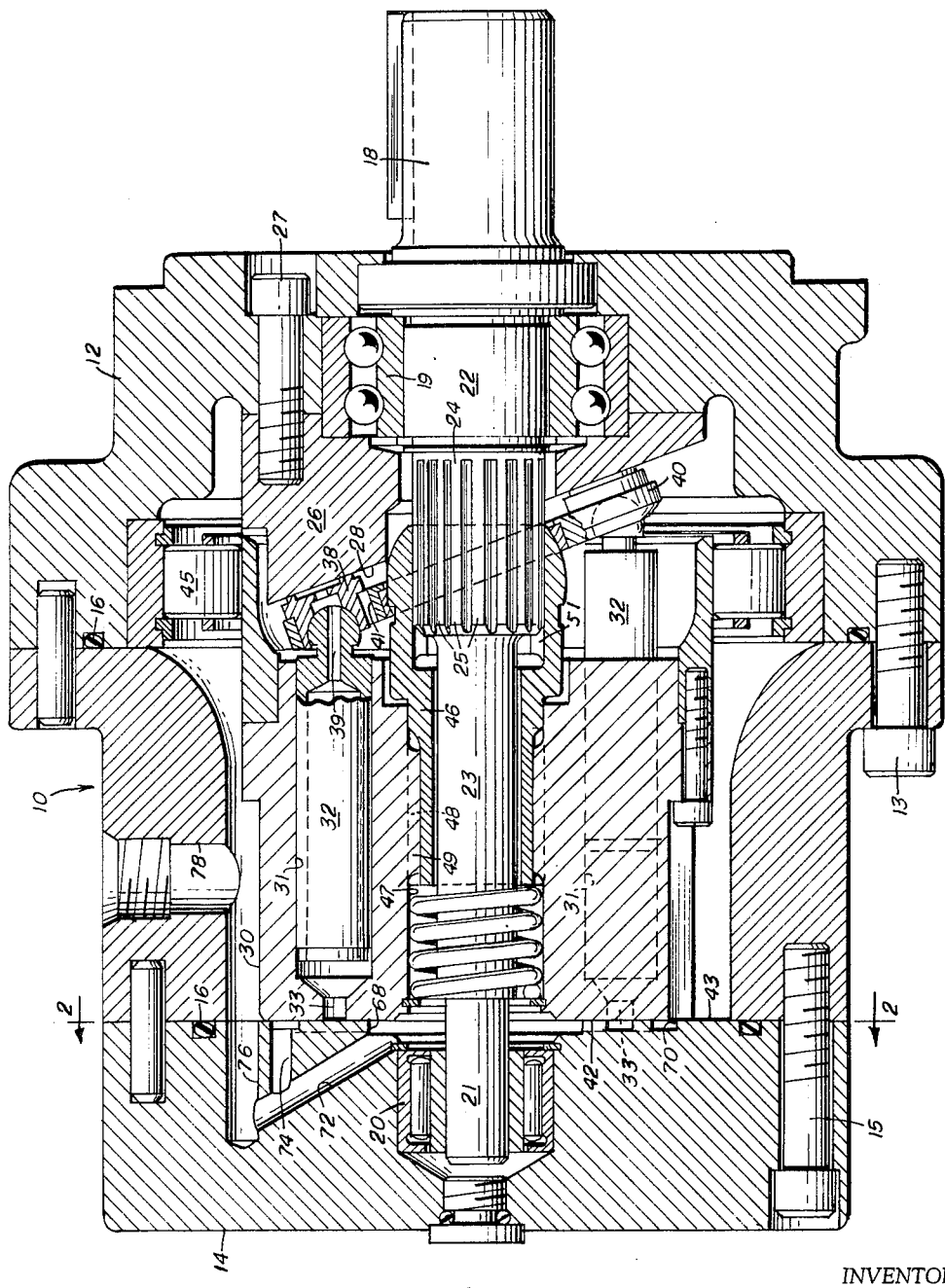
FIGURE 1 is a longitudinal sectional view of a fluid translating apparatus embodying the present invention.

Referring now more particularly to the drawings wherein like numerals indicate like parts, the numeral 10 indicates a circular housing to which a rear section 12 is fastened by cap bolts 13. The housing is enclosed at its other end by a valve plate 14 and is secured to the housing by cap bolts 15. Fluid leakage between these elements is prevented by conventional means and in the embodiment described, are disclosed as O-rings 16. An output shaft 18 is journalled in the housing at two axially spaced locations by anti-friction bearings 19 and 20, and includes a small end portion 21 piloted in the bearing assembly 20 and a larger diameter portion 22 in the bearing assembly 19. The output shaft also includes an intermediate portion 23 and a larger diameter intermediate portion 24 which is externally splined at 25.

A stationary cam plate 26 is fixed to the interior of the housing by cap bolts 27 and presents an inclined surface 28 against which the slippers, to be described, slide as they rotate.

A cylinder barrel 30 is connected to the shaft 18 for rotation therewith and includes a plurality of circumferentially spaced and axially positioned chambers or cylinders 31 in each of which a hollow piston 32 is adapted to reciprocate. At the end of each of said cylinders a passageway 33 is provided which leads to a point adjacent the valve plate 14.

Each of the pistons terminate at their rearward end in a spherical portion on which a tiltable slipper 38 is held captive and is pivotally mounted thereto. These slippers are adapted to slide against the inclined surface 28, and as the cylinder barrel rotates the pistons are reciprocated in the known manner. The interiors of pistons 32 are communicated to a hydrostatic balance surface between the slippers and surface 28 by way of a communicating passageway network generally indicated by the numeral 39. The keeper ring 40 has a series of circumferentially enlarged apertures 41, in each one of which a slipper 38 is loosely mounted. Sufficient play is left between the slipper and its respective aperture 41 to permit the slipper to slide within the aperture as the piston travels about the swash plate.

The barrel 30 has a smoothly finished front end 42 which sealingly engages the adjacent surface 43 of the valve plate. As will be more fully apparent hereinafter, the valve plate is formed with a plurality of apertures to deliver and discharge fluid from the pistons.

The barrel is mounted around the periphery of its rear end in the housing by means of the large bearing assembly 45, the assembly being firmly mounted to the housing. A sleeve 46 is located on shaft 18 in the bore 47 of the barrel and is splined to each for rotation therewith as a unit. The sleeve can also slide axially relative to both the shaft 18 and the barrel 30 as follows: The bore 47 is internally splined at 49 and thus drivingly connected with the externally splined portion 48 of the sleeve. The internally splined portion 51 of the sleeve is drivingly connected to the external spline 25 or enlarged portion 24 of the shaft 18. A spring surrounds the portion 23 and is located in the bore 47 and serves to bias the sleeve toward the cam plate 26. The particular forces and balancing characteristics of the structure thus far described can be further understood by a reference to the co-pending application Serial Number 124,718, of Phillip G. Stewart, the assignee of which also is the assignee of the instant invention, said application having been filed July 17, 1961.

The valve plate 14 is provided along its surface 43 with a plurality of kidney shaped slots 50, 52, 54 and 56 which are so disposed radially to alternately come in contact with each of the passageways 33 as the barrel 30 rotates. Each of the kidney shaped arcuate recesses are respectively communicated to further circuitry via bores 60, 62, 64 and 66.

The surface 43 is further formed with an inner annular recess 68 and an outer annular recess 70 respectively communicated to tank via the passageways 72 and 74 which in turn are in communication with a fluid reservoir via the passageways 76 and 78. These last-mentioned passageways provide a path for fluid leakage within the housing and especially that leakage between the barrel and the valve plate.

Figure 2:
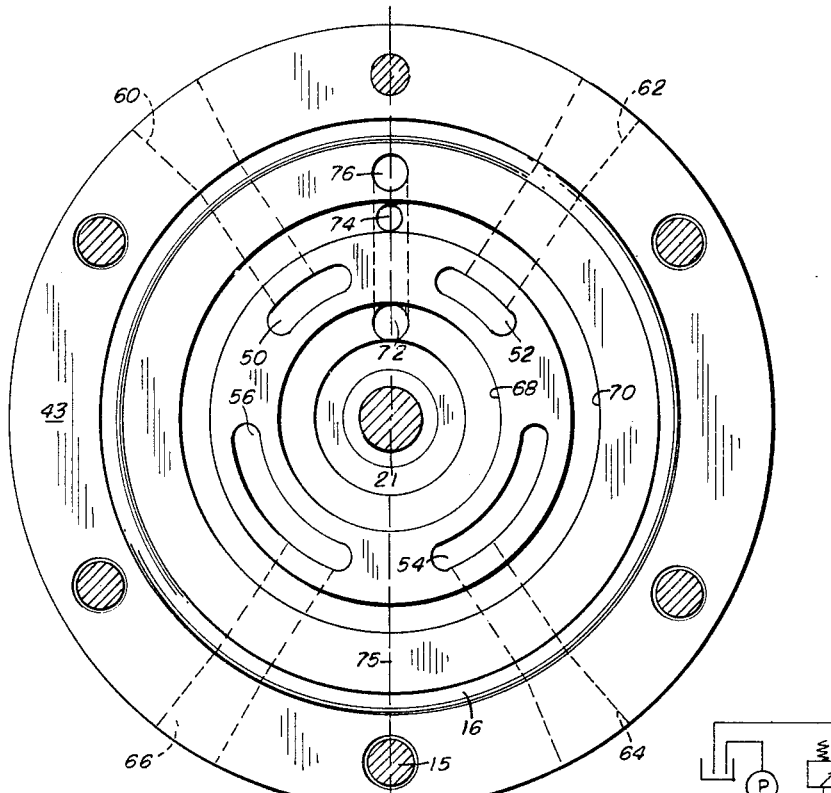
FIGURE 2 is a transverse sectional view taken generally along the line 2—2 of FIG. 1.
Figure 3:
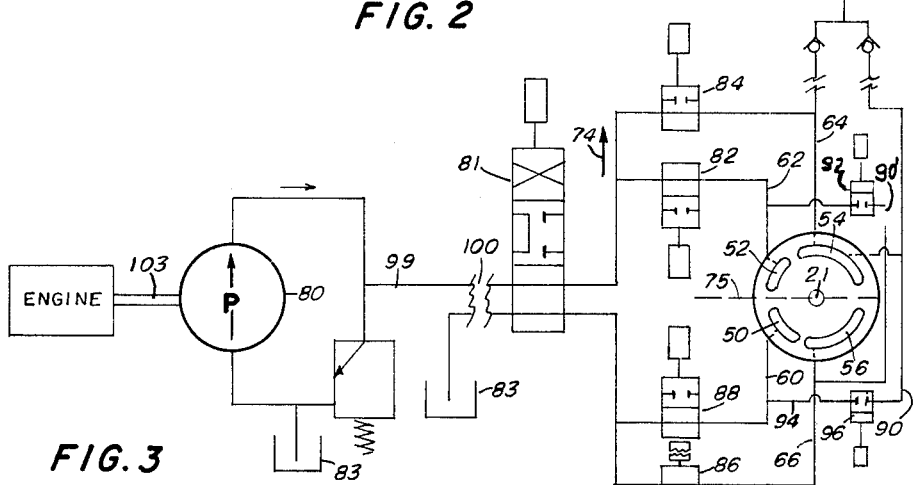
FIGURE 3 is a diagrammatic-schematic view showing fluid flow with certain circuitry used with the fluid translating apparatus.

Assuming, for purposes of description, that the barrel 30 is rotating clockwise as it faces the valve plate in FIG. 2, and that a pump 80 is providing pressurized fluid along the path designated by the arrow, it can be seen that the arcuate recesses 52 and 54 are subjected to pressurized fluid respectively via lines 62 and 64. Assuming further that the portion to the right of a phantom line 75 extends from an upper point of maximum thickness on cam plate 26 to a lower point of minimum thickness, it can be seen that with directional valve 81 and line valves 82 and 84 disposed as seen in FIG. 3, full displacement of the pistons 32 results as they travel from the vertical high to the vertical low. It can also be understood that as the pistons traverse the arcuate slots 56 and 50 they exhaust fluid to tank 83 via the lines 60 and 66, and the valve 81.

Assuming identical conditions, but with line valve 82 in its blocking position, the recess 52 is not pressurized and the pistons 32 will receive no fluid as they traverse that recess. Since the fluid from the pump must be routed entirely through line 64 and recess 54, a motor of less displacement, but greater speed results. Essentially, the reduced displacement is accomplished by applying fluid under pressure to each piston for only a part of the power stroke.

Alternatively, the line valve 84 can be placed with its blocking segment across line 64 causing all fluid to enter the pistons through the recess 52. Since all fluid is accepted during a very small segment of travel, a motor of very high speed and very small displacement results. The three levels of displacement; namely, (1) only recess 52 pressurized, (2) only recess 54 pressurized, and (3) both recesses 52 and 54 pressurized, can be accomplished in the opposite direction of rotation through the manipulation of valves 81 and 82–88. An optional supercharge source indicated by the numeral 89 is used to eliminate cavitations which may result in environments likely to result in the motor acting as a pump; e.g., in a dynamic braking action.

A fourth level of displacement is obtainable in each direction of rotation. First, by communicating arcuate slot 50 to arcuate slot 54 via the conduits 90 and 94 by opening blocking valve 96 when only slot 54 is pressurized. In the opposite direction the fourth level can be accomplished by communicating the arcuate slot 52 to the arcuate slot 56 via the conduit 90' by opening blocking valve 92 when slot 56 only is subjected to pressure. The valves 92 and 96 are normally in their blocking position and are moved to their passthrough position only when the fourth level of displacement is desired. If, for example, slots 50 and 52 are of a dimension causing .6 cubic inch of displacement and slots 54 and 56 are of a dimension causing 1.5 cubic inches of displacement, a combined displacement of 2.1 cubic inches is obtainable when both slots are pressurized. A displacement of .9 cubic inch is accomplished by opening conduit 94 by valve 96 so that the output slot 50 communicates with the input slot 54 when only slot 54 is pressurized. This subtracts .6 cubic inch of displacement. In other words, with valve 96 in its passthrough position and slots 54 pressurized, a level of displacement of .9 cubic inch (1.5–.6) results. When using this regeneration technique to obtain the fourth level, the supercharge power source 89 should be utilized.

Figure 4:
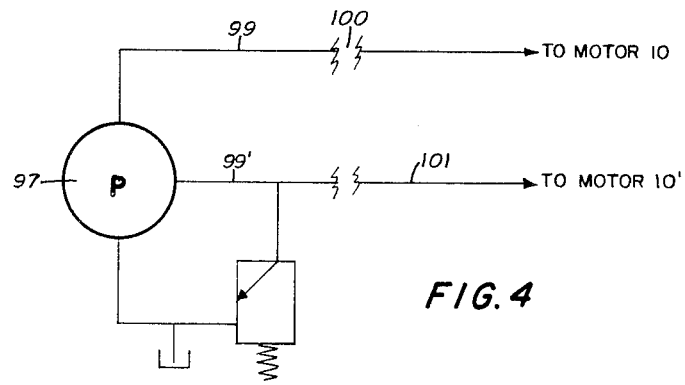
FIGURE 4 is a schematic view disclosing the combination of a divided flow pump with the apparatus of FIGS. 1, 2 and 3.

Referring to FIG. 4, there can be seen a use of the apparatus thus far described which demonstrates the invention's flexibility. The motor 10 is beneficially combined with a hydraulic pump having multiple, independent outputs. A pump 97 of this type is described in United States Patent No. 2,941,475, issued to David T. Blair on June 21, 1960, entitled, "Hydraulic Pump." Outputs 99 and 99' are each combined with independent motors such as those indicated by the numerals 10 and 10'. By so combining a motor with each of the independent multiple outlets, it is evident that step variable results can be obtained from a single pump having a plurality of fixed displacement independent outputs.

Figure 5:
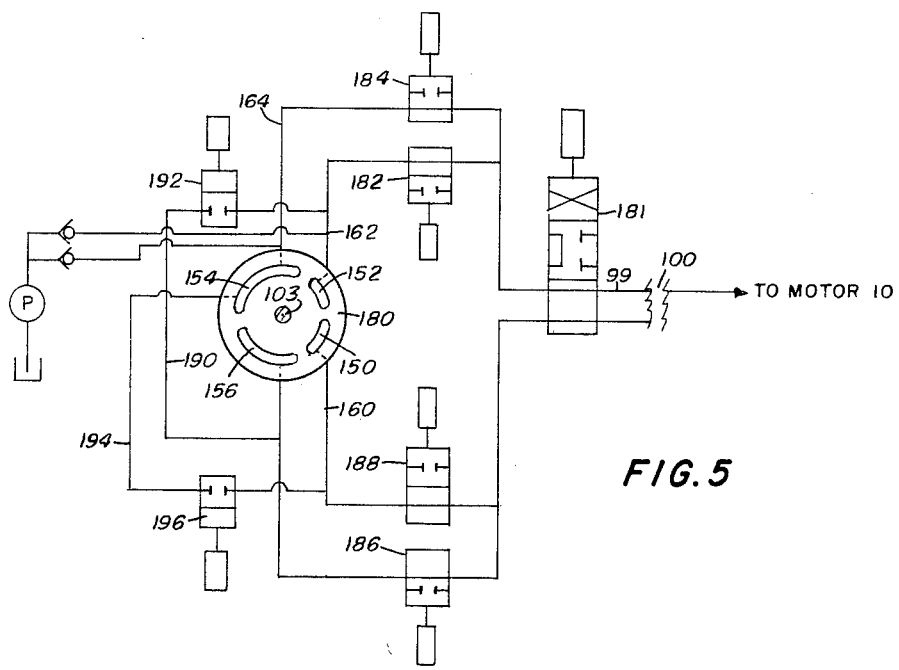
FIGURE 5 is a diagrammatic-schematic view showing a fluid transmission system.

As will be understood by those skilled in the art, the fluid translating device shown in FIG. 1 is a pump when shaft 18 is driven and pressure is removed via the ports 50–56. By so utilizing the inventive concepts thus far described, the fluid translator 10 can be converted to a pump and used in combination with a motor of like construction and circuitry. Such an arrangement is disclosed in FIG. 5 wherein the circuitry shown to the right of dividing insignia 100 is labeled with numerals identical to that previously used but in the one-hundred series. When the arrangement shown in FIG. 5 is substituted for the pump 80 and connected to the circuitry of FIG. 3, a transmission system having many levels of speed and torque results. By selectively routing the fluid outputs by manipulation of valves 182–188 and valves 192 and 196, a plurality of displacements are gained in the same manner as a plurality of displacement levels were gained in motor 10. It will be apparent that each level of displacement of pump 180 can be combined with a selected displacement level of motor 10. The resultant number of speed and torque levels is thereby substantially increased.

In a general manner, while there has been disclosed effective and efficient embodiments of the invention, it should be well understood that the invention is not limited to such embodiments as there might be changes made in the arrangement, disposition, and form of the parts without departing from the principle of the present invention as comprehended within the scope of the accompanying claims.

We claim:

1. A fluid pressure energy translating device, comprising a rotatable cylinder barrel having a bearing surface at one end and a plurality of chambers opening to said surface, a plurality of reciprocable pistons in said chambers for rotation with said barrel, a non-rotatable cam plate at the other end of said barrel against which the ends of said pistons are adapted to slide causing reciprocation of said pistons as they rotate with said barrel, a valve plate engaging said surface having first, second and third ports, said ports sequentially communicating with said chambers as said barrel rotates, a source of pressurized fluid, conduit means for delivering said pressurized fluid to said first and second ports, and valve means across said conduit means for selectively blocking fluid to either said first or second ports.

2. A fluid pressure energy translating device, comprising a rotatable cylinder barrel about a central axis having a bearing surface at one end and a plurality of chambers opening to said surface, a plurality of reciprocable pistons in said chambers for rotation with said barrel and the longitudinal axes of which are parallel to and equally spaced from said axis, a non-rotatable cam plate at the other end of said barrel against which the ends of said pistons are adapted to slide causing reciprocation of said pistons as they rotate with said barrel, a valve plate engaging said surface, said valve plate having first and second arcuate inlet ports of different lengths, and an outlet port, said ports being at a distance from center to sequentially communicate with said chambers as said barrel rotates, a source of pressurized fluid, conduit means for delivering said pressurized fluid to said inlet ports, valve means across said conduit means for selectively blocking fluid to either of said inlet ports, and second conduit exhaust means communicating with said outlet ports.

3. A fluid pressure energy translating device, comprising a barrel rotatable about an axis and having a bearing surface at one end and a plurality of elongated cylinder chambers opening to said surface, said chambers each chambers each having a longitudinal central axis parallel to said barrel axis and equally spaced therefrom, a plurality of reciprocable pistons in said chambers for rotation with said barrel, a non-rotatable cam plate at the other end of said barrel against which the ends of said pistons are adapted to slide causing reciprocation of said pistons as they rotate with said barrel, said cam plate causing a movement of said pistons away from said valve plate during a first segment of rotation and a movement toward said valve plate during a second segment of rotation, a valve plate engaging said surface and having first and second inlet ports of different lengths in opposing relationship with said first segment, an outlet port in opposing relationship with said second segment and said ports sequentially communicating with said chambers as said barrel rotates, a source of pressurized fluid, conduit means for delivering said pressurized fluid to said inlet ports, and valve means for selectively blocking fluid to either of said inlet ports.

4. A fluid pressure energy translating device, comprising a barrel rotatable about an aixs and having a bearing surface at one end and a plurality of elongated cylinder chambers opening to said surface, said chambers each having a longitudinal central axis parallel to said barrel axis and equally spaced therefrom, a plurality of reciprocable pistons in said chambers for rotation with said barrel, a non-rotatable cam plate at the other end of said barrel against which the ends of said pistons are adapted to slide causing reciprocation of said pistons as they rotate with said barrel, said cam plate causing a movement of said pistons away from said valve plate during a first segment of rotation and a movement toward said valve plate during a second segment of rotation, a valve plate engaging said bearing surface and having first and second arcuate inlet ports of different lengths in opposing relationship with said first segment, and first and second outlet ports of different lengths in opposing relationship with said second segment and said ports sequentially communicating with said chambers as said barrel rotates, a source of pressurized fluid, conduit means for delivering said pressurized fluid to said inlet ports, and valve means for selectively blocking fluid to either of said inlet ports and second valve means for returning fluid from one of said outlet ports to one of said inlet ports.

5. A fluid pressure energy translating device, comprising a barrel rotatable about an axis and having a bearing surface at one end and a plurality of elongated cylinder chambers opening to said surface, said chambers each having a longitudinal central axis parallel to said barrel axis and equally spaced therefrom, a plurality of reciprocable pistons in said chambers for rotation with said barrel, a non-rotatable cam plate at the other end of said barrel against which the ends of said pistons are adapted to slide causing reciprocation of said pistons as they rotate with said barrel, said cam plate causing a movement of said pistons away from said valve plate during a first segment of rotation and a movement toward said valve plate during a second segment of rotation, a valve plate engaging said bearing surface and having first and second arcuate inlet ports of different lengths in opposing relationship with said first segment, and first and second outlet ports of different lengths in opposing relationship with said second segment and said ports sequentially communicating with said chambers as said barrel rotates, a source of pressurized fluid, conduit means for delivering said pressurized fluid to said inlet ports, and valve means for selectively blocking fluid to either of said inlet ports and to either of said outlet ports, and further means for communicating the shorter of said outlet ports to the longer of said inlet ports.

6. A transmission system comprising a hydraulic pump having a plurality of outputs, a hydraulic motor, a fluid conduit system communicating said pump with said motor, valving means for selectively delivering one or more of said outputs to said motor as a single output, said motor comprising a rotatable cylinder barrel having a bearing surface at one end and a plurality of chambers opening to said surface, a plurality of reciprocable pistons in said chambers for rotation with said barrel, a non-rotatable cam plate at the other end of said barrel against which the ends of said pistons are adapted to slide causing reciprocation of said pistons as they rotate with said barrel, a valve plate engaging said surface and having first and second inlet ports of different lengths, and an outlet port, said ports sequentially communicating with said chambers as said barrel rotates, conduit means for delivering the fluid of said single output to said inlet ports, and valve means across said conduit means for selectively blocking fluid to either of said inlet ports.

7. A transmission system comprising a positive displacement hydraulic pump having a plurality of step-variable outputs, a positive displacement hydraulic motor, a fluid conduit system communicating said pump with said motor, said pump comprising a cylinder barrel having a bearing surface at one end and a plurality of chambers opening to said surface, a plurality of reciprocable pistons in said chambers, a cam plate at the other end of said barrel, means causing relative rotation between said barrel and said cam plate, said pistons having ends in sliding engagement with said cam plate causing reciprocation of said pistons when said barrel and said cam plate rotate with respect to one another, a valve plate engaging said surface having first, second and third ports, said ports sequentially communicating with said chambers when there is relative rotary movement between the barrel and the cam plate, means for selectively communicating one or more of said ports with said conduit system, and said motor including valving means for selectively varying displacement in the motor, whereby a selected output of said pump can be combined with a selected input to said motor.

References Cited by the Examiner
UNITED STATES PATENTS

| | | | |
|---|---|---|---|
| 1,970,530 | 8/1934 | West | 60—53 X |
| 2,276,895 | 3/1942 | Vosseler et al. | 60—53 X |
| 2,676,462 | 4/1954 | Berry | 60—52 |

SAMUEL LEVINE, *Primary Examiner.*

EDGAR W. GEOGHEGAN, *Examiner.*